US006802150B2

(12) United States Patent
Harden

(10) Patent No.: US 6,802,150 B2
(45) Date of Patent: Oct. 12, 2004

(54) FISHING ROD HOLDER

(76) Inventor: Doyle Harden, 1045 Humble St., El Paso, TX (US) 79915

( * ) Notice: Subject to any disclaimer, the term of this patent is extended or adjusted under 35 U.S.C. 154(b) by 0 days.

(21) Appl. No.: 10/353,041

(22) Filed: Jan. 29, 2003

(65) Prior Publication Data

US 2004/0144016 A1 Jul. 29, 2004

(51) Int. Cl.$^7$ ............................................... A01K 97/10
(52) U.S. Cl. ........................................................ 43/21.2
(58) Field of Search ........................... 43/21.2; 248/538, 248/514, 534

(56) References Cited

U.S. PATENT DOCUMENTS

| | | | | |
|---|---|---|---|---|
| 2,394,050 A | * | 2/1946 | Goza ........................... | 294/171 |
| 2,580,130 A | * | 12/1951 | Rowdon ...................... | 43/21.2 |
| 2,912,196 A | * | 11/1959 | Johnson ...................... | 248/538 |
| 3,555,719 A | | 1/1971 | Butler | |
| 3,570,793 A | | 3/1971 | Shackel | |
| 3,834,057 A | | 9/1974 | Jansa | |
| 4,597,551 A | * | 7/1986 | Ciechanowski et al. .... | 248/314 |
| 4,637,156 A | | 1/1987 | Simmons | |
| 4,655,492 A | * | 4/1987 | Landry ........................ | 294/15 |
| 4,753,029 A | | 6/1988 | Shaw et al. | |
| 4,763,435 A | | 8/1988 | Deering | |
| 4,807,384 A | | 2/1989 | Roberts, Sr. | |
| 4,827,654 A | | 5/1989 | Roberts | |
| 4,871,099 A | | 10/1989 | Bogar, Jr. | |
| 5,038,511 A | | 8/1991 | Gessner | |
| 5,109,579 A | * | 5/1992 | Engel .......................... | 24/339 |
| 5,184,797 A | | 2/1993 | Hurner | |
| 5,199,758 A | * | 4/1993 | Howell ........................ | 294/171 |
| 5,237,769 A | | 8/1993 | Navarro | |
| 5,313,734 A | | 5/1994 | Roberts | |
| 5,321,904 A | | 6/1994 | Benson | |
| 5,379,666 A | * | 1/1995 | Held ........................... | 81/53.1 |
| 5,437,122 A | * | 8/1995 | Wilson ........................ | 43/21.2 |
| 5,446,989 A | | 9/1995 | Stange et al. | |
| 5,561,937 A | | 10/1996 | Johnson | |
| D378,398 S | | 3/1997 | Osburn | |
| 5,724,763 A | | 3/1998 | Rasmussen | |
| 5,806,903 A | * | 9/1998 | George ....................... | 294/19.1 |
| 5,860,190 A | * | 1/1999 | Cano ........................... | 16/422 |
| 6,089,524 A | | 7/2000 | Lai | |
| 6,213,441 B1 | | 4/2001 | Baynard et al. | |
| D443,020 S | | 5/2001 | Ratza et al. | |
| 6,302,367 B1 | | 10/2001 | Ratza et al. | |
| 6,357,166 B1 | | 3/2002 | Malmanger et al. | |
| 6,370,810 B1 | | 4/2002 | Widerman | |

FOREIGN PATENT DOCUMENTS

EP            563994 A2 * 10/1993         .......... A01K/87/06

* cited by examiner

*Primary Examiner*—Kurt Rowan
*Assistant Examiner*—Joan M. Olszewski
(74) *Attorney, Agent, or Firm*—Sterne, Kessler, Goldstein & Fox P.L.L.C.

(57) ABSTRACT

A holder for a fishing rod includes an elongated hollow body with a continuous opening disposed through the upper portion of the hollow body. The opening has a shape that provides for pieces to be formed at either end of the hollow body. The pieces prevent removal of the rod unless the fishing rod is held in the same orientation as that of the opening. The holder is particularly effective in preventing the unintentional release of the rod from the holder when the blank of the rod is violently flexed.

5 Claims, 3 Drawing Sheets

FISHING ROD HOLDER

BACKGROUND OF THE INVENTION

1. Field of the Invention

This invention relates generally to a holders, supports, and steadying devices, and particularly to a fishing rod holder.

2. Background of the Invention

It is well known in the art to use devices mounted to the side of a boat or a dock or staked into the ground to support and hold a fishing rod at a desired angle for the lengthy periods of time that the fisher must wait for a fish to bite. In order to be effective, these devices must hold the fishing rod with sufficient force so as to retain the rod given normal motion, such as the rocking or bouncing of a boat in the water, and yet the device must be able to release the rod quickly enough so that the fisher may take control of the rod in order to battle the fish.

Fishing rod holding devices take many forms. Among the simplest of these are metal or plastic tubes into which the handle of the rod is inserted. These tube holders are not well-suited to accepting all types of fishing rods, such as rods with pistol handles or other unconventional handles. Also, the rod may simply fall out of the holder given the normal motion of the boat or in response to the initial bite of the fish.

Many fishing rod holders currently commercially available attempt to address the shortcomings of the simple tube holder. These more complex holders include such attributes as locking in the rod and using sophisticated mounting systems that pivot and tilt to reduce the need for extracting the rod. However, no currently available system provides fast and easy intentional extraction while inhibiting the accidental release of the fishing rod.

A particularly common type of accidental release of the fishing rod occurs when the tip of the rod is forcefully flexed, such as when a fish violently frees itself or suddenly jumps out of the water. This extraction can cause damage to or even the loss of very expensive fishing gear.

BRIEF SUMMARY OF THE INVENTION

It is an object of the present invention to provide a fishing rod holder which provides fast intentional extraction of the rod yet which reduces the incidence of unintentional release of the rod, particularly when the tip of the rod is violently flexed.

It is another object of the present invention to provide a fishing rod holder that is adaptable to a large number of fishing rods.

The present invention accomplishes these and other objects by providing a fishing rod holder made of a simple tubular element, with a continuous opening through the upper portion of the tube along the long axis of the tube. The shape of the opening is such that the remaining material at either end of the tube form pieces that hold the fishing rod blank in place, even given the violent flexing of the tip of the blank. This tube may be mounted to a surface in a variety of ways, such as direct attachment with screws or glue, or the use of any number of commercially available mounting devices. The fishing rod holder may also be integrally molded with the shell of the boat.

BRIEF DESCRIPTION OF THE DRAWINGS/FIGURES

The foregoing and other features and advantages of the invention will be apparent from the following more particular description of a preferred embodiment of the invention, as illustrated in the accompanying drawings.

DETAILED DESCRIPTION OF THE INVENTION

A preferred embodiment of the present invention is now described with reference to the figures, where like reference numbers indicate identical or functionally similar elements.

Figure 1:
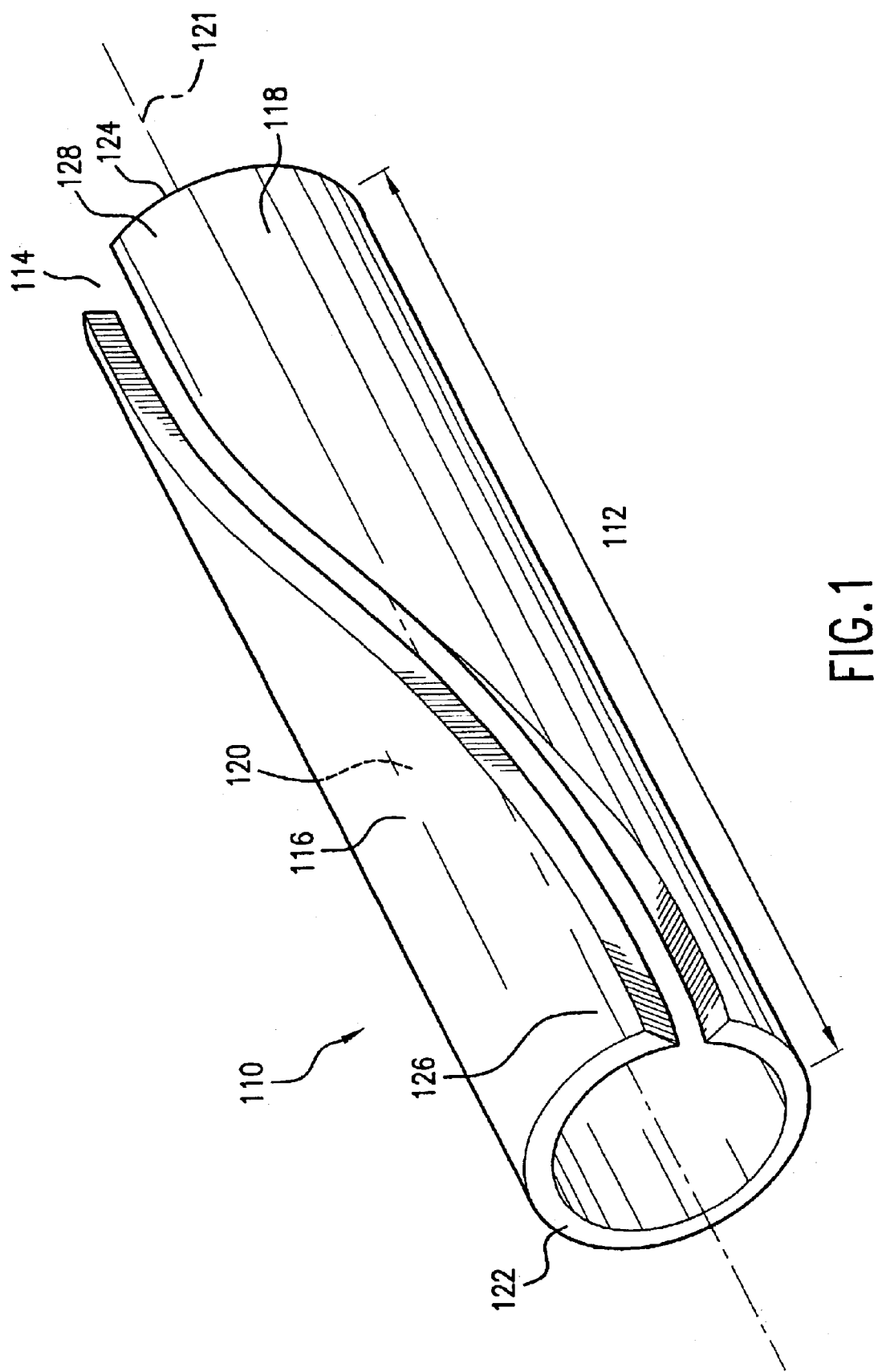
FIG. 1 is a perspective view of a fishing rod holder in accordance with the present invention.

Referring now to FIG. 1, a fishing rod holder 110 includes an elongated hollow body 112. Hollow body 112 can be made of a variety of materials, although the material must be sufficiently rigid so as to effectively retain the fishing rod when holder 110 is subjected to bouncy conditions, such as when a boat enters rough waters. As the fishing environment can be harsh and corrosive, materials that are not readily damaged by these conditions are preferred. Such materials include but are not limited to powder coated steel, PVC-coated die cast aluminum, composite materials such as fiberglass or carbon graphite epoxy, or plastics such as PVC.

The cross-sectional geometry of hollow body 112 is shown in FIG. 1 as a circle (i.e., hollow body 112 is a cylindrical tube.) However, the present invention is not so limited. The cross-sectional geometry may be of any available geometry, including but not limited to elliptical, square, and triangular.

The length of hollow body 112 may vary, depending upon factors such as the length or type of fishing rod anticipated for use with the holder or the type of mounting surface. A typical dimension for the length of hollow body 112 is approximately three to four (3–4) inches in freshwater and four to six (4–6) inches in saltwater, although the present invention is not limited to these lengths.

Through an upper portion 116 of hollow body 112 is an opening 114. Opening 114 extends from a proximal end 122 to a distal end 124 of hollow body 112, generally following the longitudinal axis 121. The width of opening 114 is sufficient to permit easy passage of standard sized fishing rod blanks, for example, one-half (½) inch.

Figure 1A:
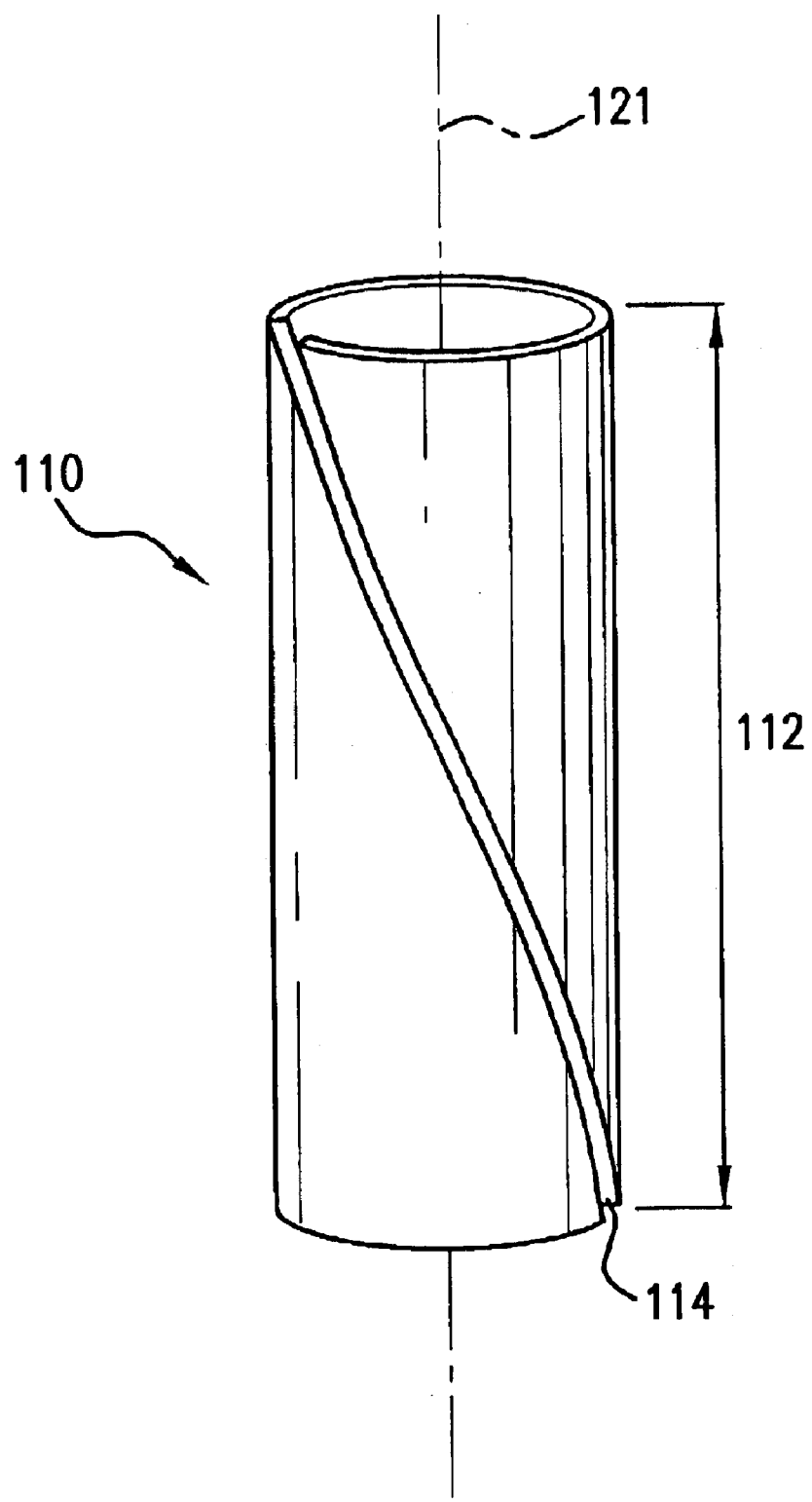
FIG. 1A is a plan view of a fishing rod holder in accordance with the present invention.

The shape of opening 114 is such that the remaining material at either end of hollow body 112 forms pieces 126, 128 that prevent the extraction of the fishing rod from holder 110 unless the rod is oriented at a specific angle with respect to holder 110. The shape of opening may be curved, particularly in a sinusoidal manner, as is shown in FIG. 1. The opening may also be a straight diagonal cut across upper portion 116, as is shown in FIG. 1A. At proximal end 122, opening 114 is disposed along a first side portion 118, forming proximal piece 126. Opening 114 passes through the center of upper portion 116 at approximately one-half the distance along longitudinal axis 121. At distal end 124, opening 114 is disposed along a second side portion 120, forming a distal piece 128.

Opening 114 may alternately be disposed along second side portion 120 at proximal end 122 and along first side portion 118 at distal end 124, forming proximal piece 126 and distal piece 128 with an opposite orientation to that of the embodiment shown in FIG. 1. This reversed orientation is advantageous as several holders may be placed together on a surface, such as the side of a boat, without the worry of the fishing rods interfering with each other during insertion or extraction.

Figure 2:
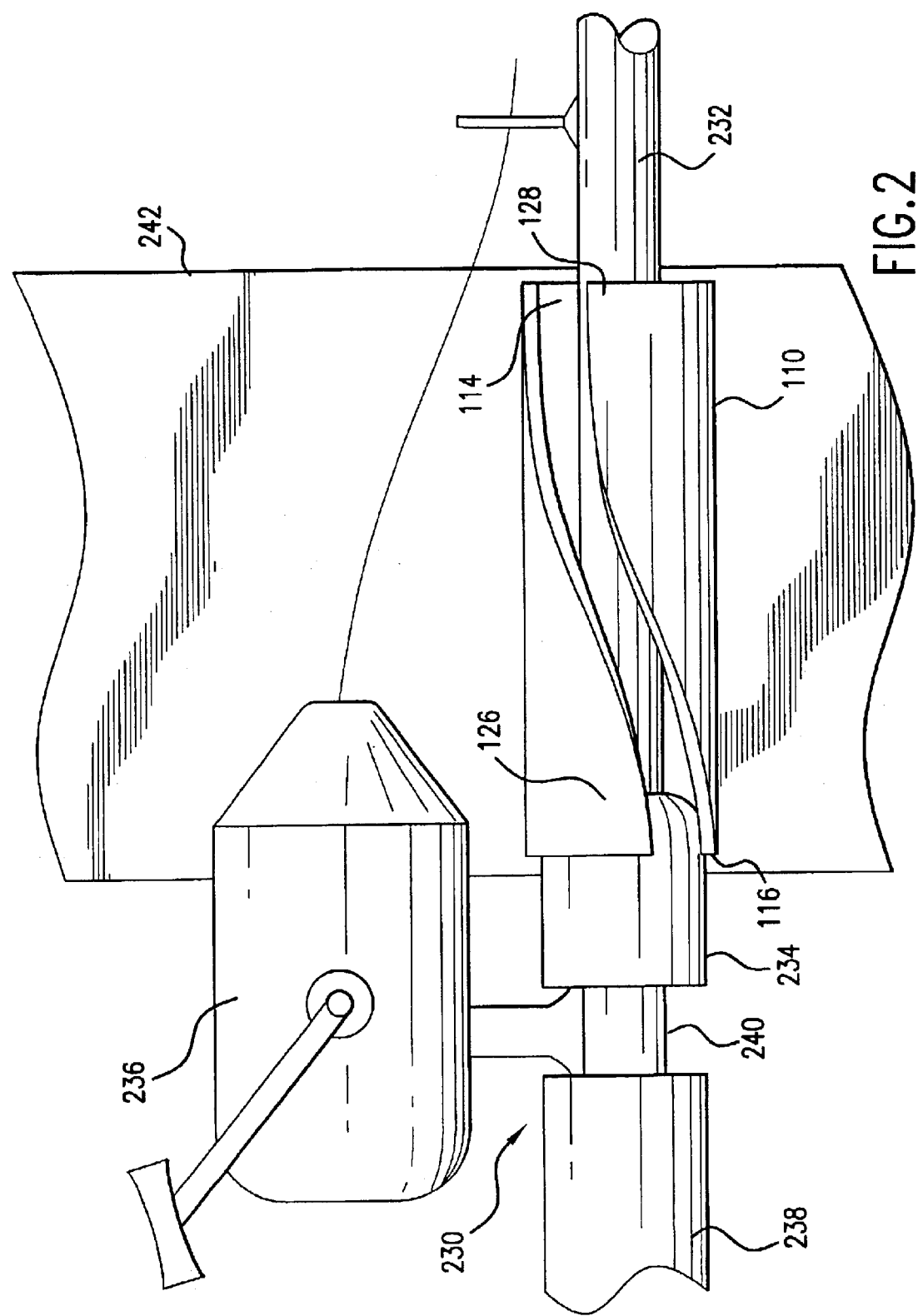
FIG. 2 shows a fishing rod holder as depicted in FIG. 1 holding a fishing rod.

Referring now to FIG. 2, a fishing rod 230 is shown held by holder 110. Holder 110 is mounted to surface 242. The method of mounting may be direct, as screws may be passed through the bottom of holder 110 and into surface 242, or holder 110 may be glued to surface 242. Such direct mounting would be desirable where surface 242 is the side of a boat. Holder 110 may also be mounted using any of the commercially available fishing rod holder mounting devices, such as those found on pages 232–233 of the Bass Pro Shops Master Catalog from Summer 2002. Further, holder 110 need not be a separate element from a boat. The shell of many boats are manufactured from moldable materials such as fiberglass or plastic that would also be suitable materials for making holder 110. The mold from which the boats are made could incorporate the structure of holder 110, resulting in the holder being an integrated protrusion from the shell of the boat.

Fishing rod 230 includes a blank 232, a grip 234, a reel 236, a handle 238, and a reel seat 240. Note that "grip" is used herein to denote only that portion of cork, synthetic foams or the like distal to reel seat 240; the material proximal to reel seat 240 is referred to herein as "handle".

The portion of blank 232 closest to grip 234 is disposed within holder 110. Proximal piece 126 and distal piece 128 prevent blank 232 from passing through opening 114, unless fishing rod 230 is specifically oriented to allow such passage. Distal piece 128 is particularly useful in preventing extraction of fishing rod 230 when the tip of blank 232 is vigorously flexed, such as may happen when fish becomes hooked.

Grip 234 abuts proximal end 116 of holder 110 and maintains frictional contact with holder 110. This frictional contact prevents fishing rod 230 from meandering within holder 110, and also helps to prevent dislodgement of fishing rod 230 from holder 110.

Reel 236 and handle 238 maintain no contact with holder 110. This aspect of the present invention differs significantly from most commercially available holders. A significant advantage of having reel 236 and handle 238 completely free from holder 110 is found in the simplicity of the movement required to manipulate fishing rod 230 into and out of holder 110. Another advantage is in avoiding damage to reel 236 as a consequence of insertion or, epecially, accidental extraction from holder 110. A further advantage is found in that reels, reel seats, and handle shapes can vary dramatically from one fishing rod to another; however, as blanks and grips are much more uniformly sized and shaped, the present invention is much more capable of being used with a large variety of fishing rods without modification than many currently available fishing rod holders.

Fishing rod 230 is inserted into holder 110 in the following manner. Holder 110 will generally be mounted to surface 242 in a fixed position, with opening 114 disposed on upper surface 116. Fishing rod 230 is held by the fisher at an angle corresponding to the general orientation of opening 114. Blank 232 is then passed through opening 114. Fishing rod 230 is straightened to align with longitudinal axis 121, and, optionally, fishing rod 230 may be rotated so that reel 236 and handle 238 are oriented according to the fisher's preference. Fishing rod 230 is then pushed forward until grip 234 maintains frictional contact with proximal end 122 of holder 110.

Extraction of fishing rod 230 is performed by simply reversing the motions for insertion. Fishing rod 230 is pulled backwards by the fisher to break the frictional contact with holder 110. Fishing rod 230 is then yawed so that the orientation of blank 232 matches that of opening 114. Blank 232 may then be easily passed through opening 114, completely releasing fishing rod 230 from holder 110.

Other than the advantages found in the simplicity and ease of insertion and extraction, a particular advantage of this method of extraction is found when a fish strikes, as the fisher does not have to push fishing rod 230 forward in order extract fishing rod 230 from holder 110. Pushing forward on fishing rod 230 could easily cause slack in the fishing line, a particularly undesirable effect when beginning to battle a fish.

While specific embodiments of the present invention have been described in detail, those skilled in the art will appreciate that various modifications and alternatives to those details could be developed in light of the overall teachings of the disclosure. Accordingly, the particular arrangement disclosed is meant to be illustrative only and does not limit the scope or the spirit of the invention, which is to be given the full breadth of the claims and any equivalents thereof.

What is claimed is:

1. A fishing system comprising:
    a fishing rod holder attached to a surface comprising
        an elongated hollow body having an upper portion, first and second side portions, a proximal end and a distal end, and
        a continuous opening disposed generally longitudinally through the upper portion of the body, said opening having such a shape that the opening at the proximal end of the hollow body is at said first side portion and the opening at the distal end of the hollow body is at said second side portion; and
    a fishing rod comprising a blank, a grip, and a reel assembly,
    the reel assembly being formed of a reel housing and a mounting structure for mounting the reel assembly to the blank, has been inserted,
    wherein the blank is disposed within the hollow body and extending out the distal end, the grip abuts the proximal end of the hollow body, and the entire reel assembly is spaced outside of the hollow body with the reel mounting structure being spaced in a longitudinal direction adjacent the proximal end of the hollow body and the reel assembly does not come in contact with the hollow body such that only minimal axial movement of the fishing rod is required to remove the fishing rod from the holder.

2. The system according to claim 1 wherein the shape of the opening is a straight diagonal line.

3. The system according to claim 1 wherein the shape of the opening is sinusoidal.

4. The system according to claim 1 wherein the hollow body is a tube.

5. The system according to claim 1 wherein the hollow body is integrally formed with the surface.

* * * * *